United States Patent
Hanya

(10) Patent No.: US 6,511,604 B2
(45) Date of Patent: Jan. 28, 2003

(54) METHOD OF TREATING A LIQUID MATERIAL AND TREATMENT FACILITIES

(75) Inventor: Toshio Hanya, 5-1-4, Nishinakajima, Yodogawa-ku, Osaka-shi, Osaka 531-0011 (JP)

(73) Assignees: Niigata Universal Science Development Co., Ltd., Niigata (JP); Toshio Hanya, Osaka (JP)

( * ) Notice: Subject to any disclaimer, the term of this patent is extended or adjusted under 35 U.S.C. 154(b) by 0 days.

(21) Appl. No.: 09/880,719

(22) Filed: Jun. 13, 2001

(65) Prior Publication Data

US 2002/0011451 A1 Jan. 31, 2002

Related U.S. Application Data

(63) Continuation of application No. 09/485,802, filed as application No. PCT/JP99/03127 on Jun. 10, 1999, now abandoned.

(30) Foreign Application Priority Data

Jun. 17, 1998 (JP) .......................... 10-169533

(51) Int. Cl.⁷ .............................. B01D 37/02
(52) U.S. Cl. .................. 210/737; 210/768; 210/772; 210/774; 210/778; 210/909; 210/805; 210/806; 210/181; 210/182; 210/193; 210/195.1; 570/211
(58) Field of Search .................. 210/768, 737, 210/772, 774, 777, 778, 805, 806, 181, 182, 193, 195.1, 908, 909; 570/211

(56) References Cited

U.S. PATENT DOCUMENTS

| | | | |
|---|---|---|---|
| 1,931,347 A | 10/1933 | Gay | 62/124 |
| 3,095,295 A | 6/1963 | Colton | 62/58 |
| 3,925,201 A | 12/1975 | Ames | 210/22 |
| 4,002,562 A | 1/1977 | Ames et al. | 210/43 |
| 4,120,787 A | 10/1978 | Yargeau | 210/26 |
| 4,260,489 A | 4/1981 | Greig et al. | 210/771 |
| 4,379,746 A | 4/1983 | Norman et al. | 208/262 |
| 4,501,670 A | 2/1985 | Tyson et al. | 210/770 |
| 4,820,420 A | 4/1989 | Hums et al. | 210/669 |
| 4,857,150 A | 8/1989 | Rival et al. | 203/41 |
| 5,300,234 A | 4/1994 | Oechsle et al. | 210/778 |
| 5,853,597 A | 12/1998 | Yoshioka et al. | 210/712 |

FOREIGN PATENT DOCUMENTS

| | | |
|---|---|---|
| JP | 47-48106 | 12/1972 |
| JP | 58-128105 | 7/1983 |
| JP | 62-266111 | 11/1987 |
| JP | 63-135489 | 6/1988 |
| JP | 7-299469 | 11/1995 |

*Primary Examiner*—Peter A. Hruskoci
(74) *Attorney, Agent, or Firm*—Knobbe Martens Olson & Bear LLP

(57) ABSTRACT

The present invention relates to the techniques of treating a liquid material to be treated, which enables efficient fractional removal of toxic materials such as PCB in a liquid mixture. The treatment method of the invention comprises the step of permitting a liquid material containing materials having different solidifying points to be cooled at a temperature at which desired material(s) is solidified while others are not solidified and the step of separating the solidified material from other liquid materials whereby the desired material is separated, and therefore large facilities are not necessary and toxic materials can be reliably separated and removed.

7 Claims, 2 Drawing Sheets

METHOD OF TREATING A LIQUID MATERIAL AND TREATMENT FACILITIES

RELATED APPLICATIONS

This application is a continuation of U.S. application Ser. No. 09/485,802, filed Feb. 14, 2000, now abandoned which is the U.S. National Phase under 35 U.S.C. §371 of International Application No. PCT/JP99/03217, filed Jun. 10, 1999 and claims priority based on JP 10-169533, filed Jun. 17, 1998. The International Application was not published under PCT Article 21(2) in English.

TECHNICAL FIELD

The present invention relates to a method of treating a liquid material to be treated and in particular to a method of treating a liquid material to be treated, which enables efficient factional removal of toxic materials such as PCB in a liquid mixture and simultaneously enables re-utilization of the separated and removed materials, as well as treatment facilities.

BACKGROUND ART

In recent years, there is demand for a reliable method of treating pollutants particularly toxic organic chemicals as a typical factor for damaging the environment. For example, materials such as PCB are chemically stable and thus hardly disposable by decomposition, but because they have strong toxicity and even in a small amount cause adverse effects on living creatures, there is a need for treatment by which such materials are decreased at minute levels. The conventional techniques of treating such materials include thermal chemical decomposition, physiochemical treatment and biological treatment, and for example incineration treatment at temperatures as high as 1200° C. or more is mainly used for waste PCB or PCB-containing waste.

However, since this conventional method requires high temperatures, large treatment facilities are required, and further because high-temperature combustion waste gas contains chlorine, secondary toxic materials such as dioxin and benzofuran can be generated upon cooling, which requires special consideration, resulting in the problem of higher costs for treatment facilities as a whole.

DISCLOSURE OF THE INVENTION

In view of the problems in the prior art described above, an object of this invention is to provide a treatment method capable of reliably separating and removing toxic materials at lower facility costs, as well as treatment facilities therefor.

Another object of the present invention is to provide a method of rendering the separated and removed toxic materials re-utilizable as well as facilities therefor.

The object described above is accomplished by the invention described in the claims. That is, the characteristic constitution of the method of treating a liquid material to be treated according to the present invention lies in comprising the step of permitting a liquid treatment material containing materials having different solidifying points to be cooled at a temperature at which desired materials are solidified while others are not solidified and the step of separating the solidified materials from other liquid materials whereby the desired materials are separated.

By doing so, the materials desired to be separated and removed can be reliably separated in a solid form from other liquid components and simultaneously the separation of the desired materials from the remainder in a post-treatment step is made easy, so that no secondary toxic materials are generated and large facilities required in heat treatment are not necessary, thus reducing facility costs and making this method effective for separation and removal of toxic materials.

Further, the step of separating said separated solidified materials from other liquid materials may be conducted by separating from one another by vacuum filtration, and at the time of this separation treatment, a filter aid may be added.

By doing so, the separation of said desired solidified materials from other liquid components is facilitated and promoted, while even if the amount of the materials separated is small, the materials can be more reliably extracted from the treated liquid material by the adsorption action of the filter aid, and said materials can be separated and removed from other liquid components.

Furthermore, it is preferable that after said filter aid is introduced into a vacuum filtration device, a mixture of said solidified materials to be separated and other liquid materials is added to said filter aid.

By doing so, the solidified materials to be separated are certainly adsorbed into the filter aid, while a very small amount of the materials to be separated, which are present as a mixture with liquid components, can be conveniently captured by the filter aid.

Furthermore, it is preferable to conduct the step in which the material to be separated is separated through elution from said filter aid to which said material binds.

By doing so, the aid can be utilized again as a filter aid, and by post-treatment (solidification treatment etc. along with dilution), the separated materials can be conveniently utilized again as e.g. solid fuels.

Then, the characteristic constitution of the treatment facilities for a liquid material to be treated according to the present invention lies in comprising a cooling means capable of permitting a liquid material containing materials having different solidifying points to be cooled at a temperature at which materials desired to be separated are solidified while others are not solidified, a separation means capable of separating the desired solidified materials from other liquid materials to separate the desired materials, and a device for recovering each of the separated materials.

By this constitution, large and complicated facilities required in heat treatment etc. are not necessary for removing the separated materials from the treated liquid material, so the desired materials can be separated reliably at low production costs.

Further, said cooling means may be provided with a primary liquid-cooling tank capable of permitting said liquid material treated to be cooled at low temperatures and a secondary cooling storage tank capable of permitting said liquid material from the primary liquid-cooling tank to be kept cool at low temperatures.

By this constitution, electric energy consumption costs can be conveniently reduced as compared with cooling all at once particularly where a large amount of materials is to be treated.

Furthermore, it is preferable that the means of separating said desired solidified material from other liquid materials is a vacuum filtration device and is provided with a filter aid-feeding means for adding a filter aid to said vacuum filtration device.

By this constitution, the separation of the desired solidified materials from other liquid components is facilitated and promoted, while even if the amount of the desired materials to be separated is small, the materials can be more reliably extracted from the treated liquid material by the adsorption action of the filter aid, and said materials can be separated and removed from other liquid components.

It is preferable that the treatment facilities are provided with a recovery device for recovery and storage of said separated materials from said vacuum filtration device and simultaneously with a means of heating said recovery device to further separate said filter aid from said recovered separated material.

By this constitution, the aid can be utilized again as a filter aid, and by post-treatment (solidification treatment etc. along with dilution), the separated materials can be conveniently utilized again as e.g. solid fuels.

BEST MODE FOR CARRYING OUT THE INVENTION

Figure 1:
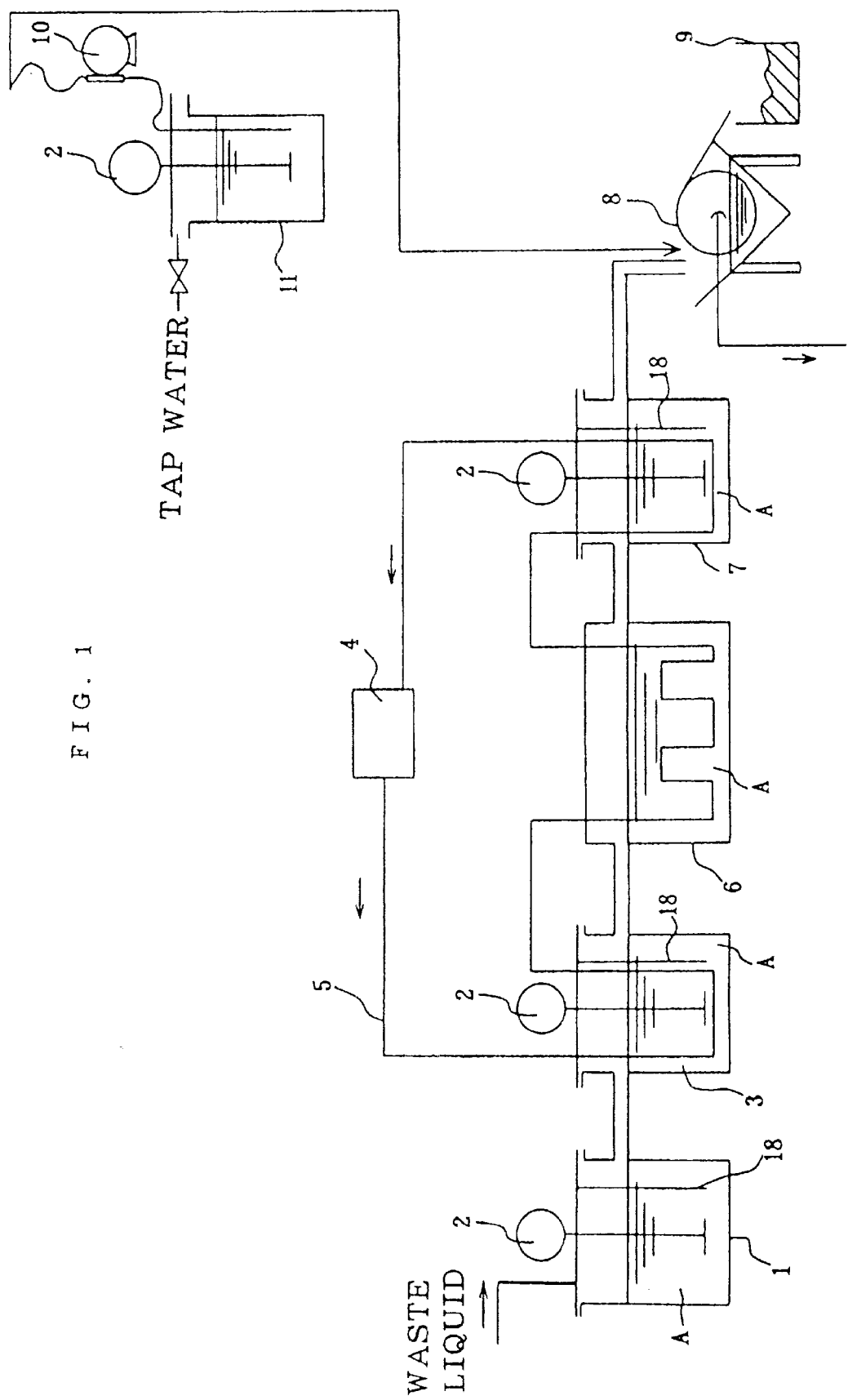
FIG. 1 shows a schematic representation of treatment facilities for carrying out the invention.

The treatment method and treatment facilities according to the present invention are described in detail by reference to the drawings. FIG. 1 shows the whole constitution of treatment facilities in one embodiment of the invention. The separation treatment of PCB is described by using PCB-containing waste oil as liquid A to be treated in this embodiment.

First, waste oil A as PCB-containing waste liquid to be separated is introduced into a waste liquid storage tank 1 and stored once therein. The waste oil A stored in the waste liquid storage tank 1 is always stirred by stirrer 2, to form an uniform waste liquid to be sent to the next step. The homogenized waste oil A is sent to a primary liquid-cooling tank 3 where it is cooled to a predetermined temperature by a refrigerant tube 5 extending from a separately provided chiller unit 4. After transfer of the waste oil stored in the waste liquid storage tank 1 to the primary liquid-cooling tank 3 is completed, new waste oil is subsequently filled in the waste liquid storage tank 1 and stirred therein.

The waste oil A introduced into the primary liquid-cooling tank 3 is also uniformly cooled by being stirred by stirrer 2. By introducing the waste oil A into the primary liquid-cooling tank 3, oil with a low solidifying point remains liquid whereas PCB having a high solidifying point is initiated to be solidified. The PCB initiated to be solidified is circulated in the tank by the stirrer, during which its solidification proceeds. The cooling temperature in this case varies depending on the type of PCB as the object of separation in waste oil A; for example, if Kanechlor 300® (Kaneka Corporation) as PCB is contained in waste oil A, a temperature of −20° C. or less is preferable, while if Kanechlor 400® (Kaneka Corporation) is contained, a temperature of −10° C. or less is preferable. If it is suspected that Kanechlor 300 and Kanechlor 400 are mixed, the temperature should be set at their lower solidifying point or less.

Then, waste oil A whose solidification has proceeded under sufficient cooling is sent to a secondary cooling tank 6 and kept at a predetermined cooling temperature by the refrigerant tube 5 extending from the chiller unit 4, similarly to the primary liquid-cooling tank 3. The material to be treated is transferred from the primary liquid-cooling tank 3 to the secondary cooling storage tank 6, and waste oil is transferred from the waste liquid storage tank 1 to the emptied primary liquid-cooling tank 3, and this waste oil is cooled. A solid-liquid mixture formed by cooling in the primary liquid-cooling tank 3 is stored until the amount of the mixture reaches a certain level in the secondary cooling tank 6 where the internal volume of the secondary cooling storage tank 6 is made larger than the internal volume of the primary liquid-cooling tank 3, and then the mixture is transferred to a separation device in the next step; this is preferable for higher recovery in the separation device.

Solidified PCB and waste oil separated into other oils are once transferred to a liquid-cooling tank 7 before transfer to the separation device. The refrigerant tube 5 from said chiller unit 4 has been introduced into the liquid-cooling tank 7 as well, to permit the materials to be kept cool at a predetermined temperature or less again. If the amount of the materials treated in the secondary cooling storage tank 6 is high, there can be a difference in temperature between the surface and the inside of the materials during maintained in the secondary cooling storage tank 6, so it is preferable that the waste oil A introduced into the liquid-cooling tank 7 is cooled under stirring in tank 7 whereby PCB is reliably prevented from being re-dissolved.

Then, the solid-liquid mixture in the liquid-cooling tank 7 is introduced into a vacuum filtration liquid-removing tank 8 as the vacuum filtration device equipped with an air cylinder, where the solidified PCB is separated by filtration from the oil. In this case, it is preferred that a filter aid is introduced together with tap water by e.g. pump 10 from a filter aid tank 11 into the vacuum filtration liquid-removing tank 8 in order to improve separation efficiency and to promote filtration. That is, the filter aid is previously placed on the surface of the vacuum filtration liquid-removing tank 8 to which the solid-liquid mixture is then transferred from the cooling storage tank 7 whereby the mixture is brought into contact with the filter aid. By doing so, the solidified PCB is adsorbed into the filter aid, and these are aggregated with one another whereby the PCB is easily recovered and simultaneously the clogging of the filter material can be prevented, while other liquid components can be easily filtered. The filter aid tank 11, pump 10 and a pipe connecting them constitute a filter aid-feeding means. When tap water is used after being subjected to e.g. anti-freezing treatment and cooled as low as possible, re-dissolution of solidified PCB can be conveniently minimized. Further, a refrigerant with a temperature not more than the solidifying point of PCB may be used in place of tap water in order to maintain the solidification of PCB. The filter aid may be introduced into the liquid-cooling tank 7 in the previous step in place of the vacuum filtration liquid-removing tank 8 described above.

The filter aid can make use of powdery diatomaceous earth, china clay etc. Oil not solidified is filtered through it and stored downward in the tank, while PCB remaining on the filter material is removed at right time and sent to a slurry recovery tank 9. Such recovery of PCB can be conducted manually or mechanically with an automatic means, as conventionally conducted. On one hand, the filtered oil is recovered and can be utilized again if the amount of PCB therein is at allowable levels for waste liquid.

Figure 2:
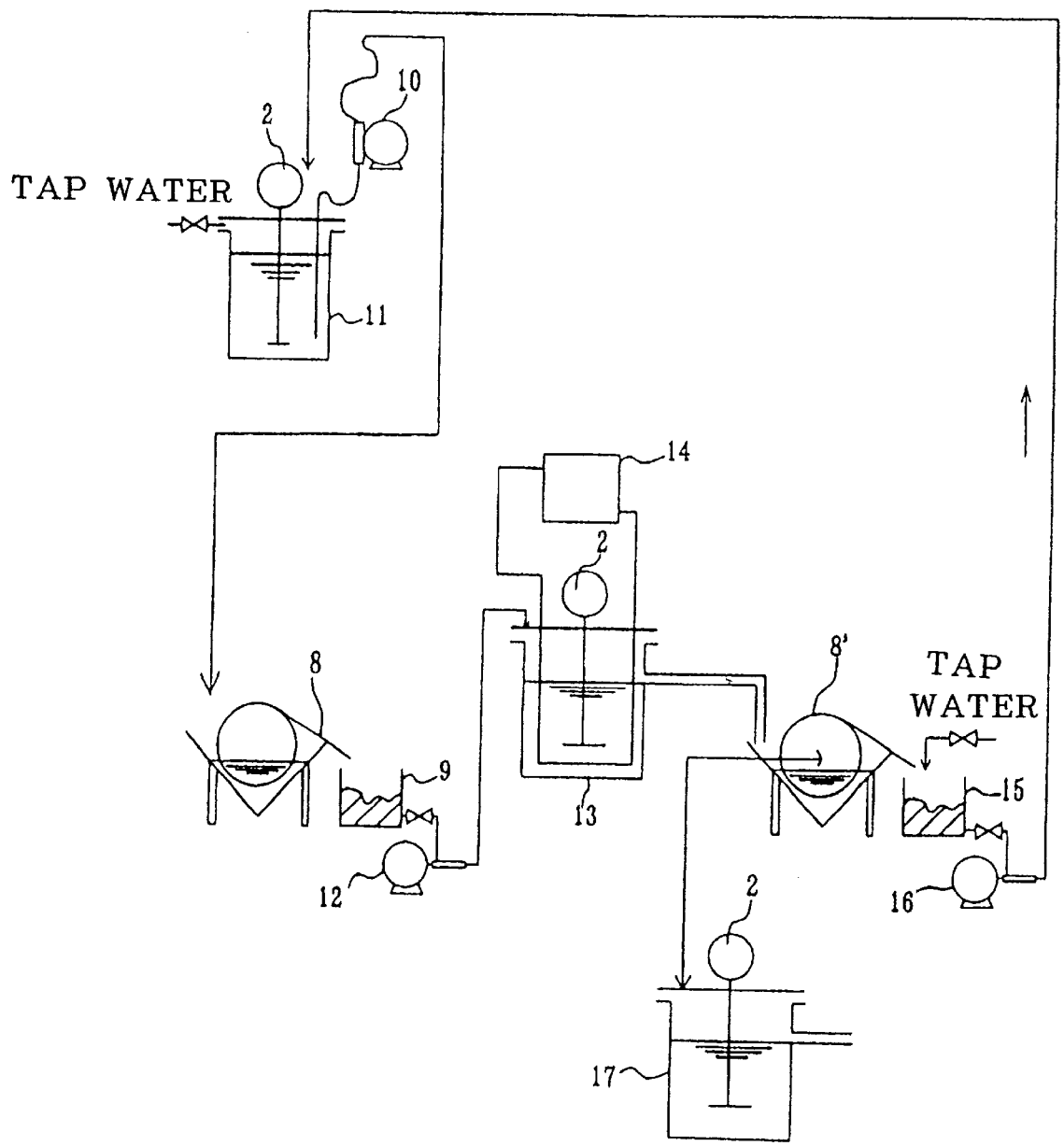
FIG. 2 shows a schematic representation of treatment facilities which can be used in the post-treatment of the present invention.

If the filter aid is used, the post-treatment described below is preferably used for separation and removal of PCB from the filter aid. That is, as shown in FIG. 2, the slurry is sent from a slurry recovery tank 9 via a slurry-feeding screw pump 12 to a slurry elution tank 13, that is, a recovery device for recovery and storage of the separated material. A pipe for circulating hot water from a separately provided hot water-feeding tank 14 (circulation pump is not shown) is introduced into the slurry elution tank 13, and when hot water is circulated through this pipe, the slurry is heated under stirring at a temperature higher than the solidifying point of PCB whereby PCB is easily eluted and separated from the filter aid. In this case, an immersion heater etc. in addition to the pipe from the hot water-feeding tank 14 may be introduced into the slurry elution tank 13 to promote heating. The content in the slurry elution tank 13 is preferably controlled with a controller such that it is heated at a predetermined temperature for a predetermined period of time.

A heated mixture of the filter aid and PCB is introduced into another vacuum filtration liquid-removing tank 8' where the filter aid and eluted PCB are separated from each other. After the filter aid is stored in a filter aid-recovering tank 15, the filter aid with tap water etc. added as necessary is sent by a filter aid-sending screw pump 16 to a filter aid tank 11 and then utilized again. In place of the separately provided hot water-feeding tank 14, the slurry elution tank 13 itself may be provided with a heating means such as a heater to heat the slurry. On one hand, the eluted PCB is sent to a PCB solution-recovering storage tank 17 where it is diluted below allowable levels with kerosene, solvent or the like and simultaneously solidified with a solidifying agent and utilized again as solid fuels.

In the above-described step of separating PCB from oil, the same step described above for the filtered oil is repeatedly conducted to further improve the recovery of PCB. In this case, the filtered oil may be introduced into the waste liquid storage tank 1, but a separate waste liquid treating line can also be provided to further improve the recovery of PCB more efficiently. That is, as described above, the oil recovered from the vacuum filtration liquid-removing tank 8 is introduced into the primary liquid-cooling tank cooled at a predetermined temperature by the refrigerant tube extending from the chiller unit, then sent to the secondary cooling storage tank, and further sent to another vacuum filtration liquid-removing tank where PCB is separated and removed while PCB-free oil is recovered.

Such steps may be further repeated until the content of toxic materials in the recovered oil can be reduced to a predetermined amount or less (e.g. PCB levels in waste water should be 3 ppb). Further, it is preferable that after waste oil is introduced into the waste liquid storage tank 1, the whole of treatment facilities for the subsequent steps are arranged in a room at low temperatures. This is because by doing so, it is possible to certainly prevent the possible re-dissolution of the treated material at an increasing temperature through the steps.

EXAMPLES

About 50-L waste oil containing 5 to 20% Kanechlor 300® (Kaneka Corporation) was introduced into the waste liquid storage tank 1 and then mixed sufficiently. Then, it was introduced into the primary cooling tank 3 where its cooling was initiated. After sufficiently stirred under cooling, the waste oil was sent to the secondary cooling storage tank 6 where it was cooled at −20° C. or less with an ultra-low-temperature freezer having a particularly high cooling ability. After the waste oil was introduced into the waste liquid storage tank, about 3 hours was required until PCB was solidified and separated by cooling at −20° C. or less. This waste oil containing both solids and liquid was sent to the liquid-cooling tank 7 into which a filter aid consisting of powdery diatomaceous earth etc. had been introduced, and then the waste oil was sent to the vacuum filtration liquid-removing tank 8, and the oil in the liquid was separated and sent into another filtration storage tank (not shown) and the solidified PCB and the filter aid (containing adsorbed PCB) were sent to the slurry recovery tank 9. The first cooling tank 3, the secondary cooling storage tank 6, the liquid-cooling tank 7 and the vacuum filtration liquid-removing tank 8 were arranged in a cold room at −10° C. or less where the treatment described above was performed. The content of PCB in the separated liquid oil was not more than 0.05 mg/L.

To make sure, the separated oil described above was subjected again to the process described above (that is, the process starting from the step in the secondary cooling tank). As a result, PCB was not detected in the separated oil. Then, the solid PCB and the filter aid separated from the vacuum filtration liquid-removing tank 8 were sent to the slurry elution tank 13 where the filter aid and the PCB were separated from each other by heating. As a result of analysis of the separated filter aid, PCB was not detected therein.

[Other Embodiments]

(1) Waste liquid as material A to be treated may be transferred by sending it continuously little by little downward from the waste liquid storage tank 1, through the primary liquid-cooling tank 3 and the secondary cooling storage tank 6, to the liquid-cooling tank 7. In this case, as shown in FIG. 1, a separating wall 18 which is suspended from the lid member is provided in the vicinity of the outlet of the waste liquid storage tank 1, and the waste liquid is allowed to flow continuously downward. The lower part of the separating wall 18 is close to the bottom of the waste liquid storage tank 1, but because there is a gap therebetween, homogenized waste liquid is sent through the gap to the next primary liquid-cooling tank 3. By this constitution, a loss in time is reduced and time efficiency is conveniently raised as compared with the system where waste liquid is downward added batchwise after each tank is emptied.

Similarly, a separating wall 18 is provided in the vicinity of the outlet of the primary liquid-cooling tank 3, and the waste liquid is sent toward the next secondary cooling storage tank 6. It is preferable that after predetermined conditions are reached in each tank, the transfer of the waste liquid to the next tank is controlled. This separating wall 18 may be provided on each tank, depending on the object.

(2) The material separated from waste oil as the waste liquid may be separated from oil as another component in only the primary liquid-cooling tank, or the waste liquid may be cooled at a certain low temperature in the primary liquid-cooling tank and then cooled at a final temperature in the secondary cooling storage tank. When the amount of waste oil is large, the latter system is preferable because the electric consumption for cooling can be reduced. As a matter of course, for efficient and rapid treatment of a large amount of waste oil, it may be cooled in further multiple stages.

(3) For cooling of waste oil, a refrigerant may be sent through a pipe from the separately arranged chiller unit 4, or alternatively heat exchangers provided around or in the primary liquid-cooling tank and the secondary cooling storage tank themselves may be used to directly cool the primary liquid-cooling tank and the secondary cooling storage tank.

(4) Further, the primary liquid-cooling tank 3, the secondary cooling storage tank 6, and the liquid-cooling tank 7 may be cooled by separate cooling means. This constitution is preferable because the temperature conditions etc. can be controlled independently.

(5) The embodiment described above involves treating waste oil in a batch system, but continuous treatment is also feasible. In this case, new waste liquid to be continuously fed will be mixed with another waste liquid after treatment, so preferably treatment abilities such as cooling ability are raised as a whole.

(6) In the embodiment described above, PCB-containing waste oil is referred to as the liquid material containing materials having different solidifying points, but the present invention is not limited to such a material and can also be applied to a liquid material containing toxic materials such as specific chemical compounds and other toxic or harmless materials.

INDUSTRIAL APPLICABILITY

The present invention can be utilized as the techniques of not only separating and removing PCB from PCB-containing waste oil and re-utilization thereof, but also separating and removing toxic materials from toxic material-containing waste consisting of different components having at least different solidifying points as well as re-utilization of each of the removed materials.

What is claimed is:

1. A method of separating polychlorobiphenyl (PCB) from a PCB-containing waste oil which contains PCB having a different solidifying point than the remaining waste oil, comprising the steps of:

cooling the PCB-containing waste oil to a temperature at which PCB is solidified while the remaining waste oil is not solidified, wherein said cooling step includes transferring said waste oil to a primary liquid cooling tank, a secondary cooling tank, and a third cooling tank, to prevent the solidified PCB from being redissolved;

contacting the waste oil containing the solidified PCB with a filter aid to which the solidified PCB binds;

separating the PCB-bound filter aid from the remaining waste oil by filtration; and eluting the PCB from said PCB-bound filter aid to separate the PCB.

2. The treatment method according to claim 1, wherein said filtration is conducted by vacuum filtration.

3. The method according to claim 1, wherein the PCB is eluted by heating.

4. An apparatus for separating PCB from PCB-containing waste oil which contains PCB having a different solidifying point than the remaining waste oil, comprising:

a primary cooling tank for cooling the PCB-containing waste oil to a temperature at which PCB is solidified while the remaining waste oil is not solidified;

a secondary cooling tank for additionally cooling the PCB-containing waste oil to enhance solidification of the PCB;

a third cooling tank for additionally cooling the PCB-containing waste oil cooled in the secondary cooling tank, to prevent the solidified PCB from being redissolved;

a separator for separating said solidified PCB from the remaining waste oil by filtration;

a filter aid tank for adding a filter aid to contact the filter aid with the solidified PCB upstream of said separator wherein the solidified PCB is bound to the filter aid; and a recovery device for eluting and recovering the PCB from the PCB-bound filter aid.

5. The apparatus according to claim 4, wherein said separator is a vacuum filtration device.

6. The apparatus according to claim 5, further comprising a heater for heating said recovery device to further separate said filter aid from said recovered PCB.

7. The apparatus according to claim 4, wherein the recovery device includes a heater to elute the PCB from the PCB-bound filter aid by heating.

* * * * *